US007162736B2

(12) United States Patent
Koistinen et al.

(10) Patent No.: US 7,162,736 B2
(45) Date of Patent: Jan. 9, 2007

(54) REMOTE UNBLOCKING WITH A SECURITY AGENT

(75) Inventors: Martin J. Koistinen, Houston, TX (US); Johann O. Bazzali, Houston, TX (US)

(73) Assignee: Schlumberger Omnes, Inc., Houston, TX (US)

( * ) Notice: Subject to any disclaimer, the term of this patent is extended or adjusted under 35 U.S.C. 154(b) by 936 days.

(21) Appl. No.: 09/932,882

(22) Filed: Aug. 20, 2001

(65) Prior Publication Data

US 2003/0037259 A1 Feb. 20, 2003

(51) Int. Cl.
*G06F 7/04* (2006.01)
*G06K 9/00* (2006.01)

(52) U.S. Cl. ............... 726/9; 713/153; 713/182; 713/183; 713/201

(58) Field of Classification Search ........... 713/153, 713/182, 183, 201; 726/9
See application file for complete search history.

(56) References Cited

U.S. PATENT DOCUMENTS

| 5,068,894 | A | 11/1991 | Hoppe | 380/23 |
|---|---|---|---|---|
| 5,534,857 | A | 7/1996 | Laing et al. | 340/825.34 |
| 5,742,756 | A | 4/1998 | Dillaway et al. | 395/186 |
| 5,838,251 | A | 11/1998 | Brinkmeyer et al. | 340/825.31 |
| 5,850,442 | A | 12/1998 | Muftic | 380/21 |
| 5,907,804 | A | 5/1999 | Schroderus et al. | 455/411 |
| 5,943,423 | A | 8/1999 | Muftic | 380/25 |
| 5,949,882 | A * | 9/1999 | Angelo | 713/185 |
| 6,005,942 | A | 12/1999 | Chan et al. | 380/25 |
| 6,014,748 | A | 1/2000 | Tushie et al. | 713/200 |
| 6,138,239 | A | 10/2000 | Veil | 713/200 |
| 6,179,205 | B1 | 1/2001 | Sloan | 235/382 |
| 6,182,894 | B1 | 2/2001 | Hackett et al. | 235/380 |
| 6,226,744 | B1 | 5/2001 | Murphy et al. | 713/200 |
| 6,240,513 | B1 * | 5/2001 | Friedman et al. | 713/152 |
| 6,542,729 | B1 * | 4/2003 | Chmaytelli et al. | 455/410 |
| 2002/0034940 | A1 * | 3/2002 | Takae et al. | 455/418 |
| 2002/0112156 | A1 * | 8/2002 | Gien et al. | 713/156 |
| 2002/0138553 | A1 * | 9/2002 | Binder | 709/203 |
| 2003/0013434 | A1 * | 1/2003 | Rosenberg et al. | 455/414 |

FOREIGN PATENT DOCUMENTS

| EP | 0820207 A2 * | 1/1998 |
|---|---|---|
| EP | 1 074 906 A1 | 2/2001 |

OTHER PUBLICATIONS

Menezes, Alfred J. Handbook of Applied Cryptography. 1997. CRC Press. pp. 15-17 and 388-390.*
International Search Report dated Nov. 11, 2003 (2 pgs.).

* cited by examiner

*Primary Examiner*—Emmanuel L. Moise
*Assistant Examiner*—Kevin Schubert
(74) *Attorney, Agent, or Firm*—Osha Liang LLP (57) ABSTRACT

An apparatus to unblock a security device issued to an end user includes an unblocking service for establishing a secure gateway. A client-side applet securely transfers information among the unblocking service, the end user, and the security device. An agent-side applet securely transfers information between the unblocking service and a security agent. An Unblock Authorization Code (UAC) is securely transferred from the agent-side applet and the client-side applet to the unblocking service. An Unblock Code (UBC) is securely transferred from the unblocking service to the client-side applet. The client-side applet is set to check at a configurable frequency for determining that the UAC is generated. The client-side applet uses the UBC to unblock the security device.

32 Claims, 12 Drawing Sheets

REMOTE UNBLOCKING WITH A SECURITY AGENT

BACKGROUND OF THE INVENTION

Figure 1:
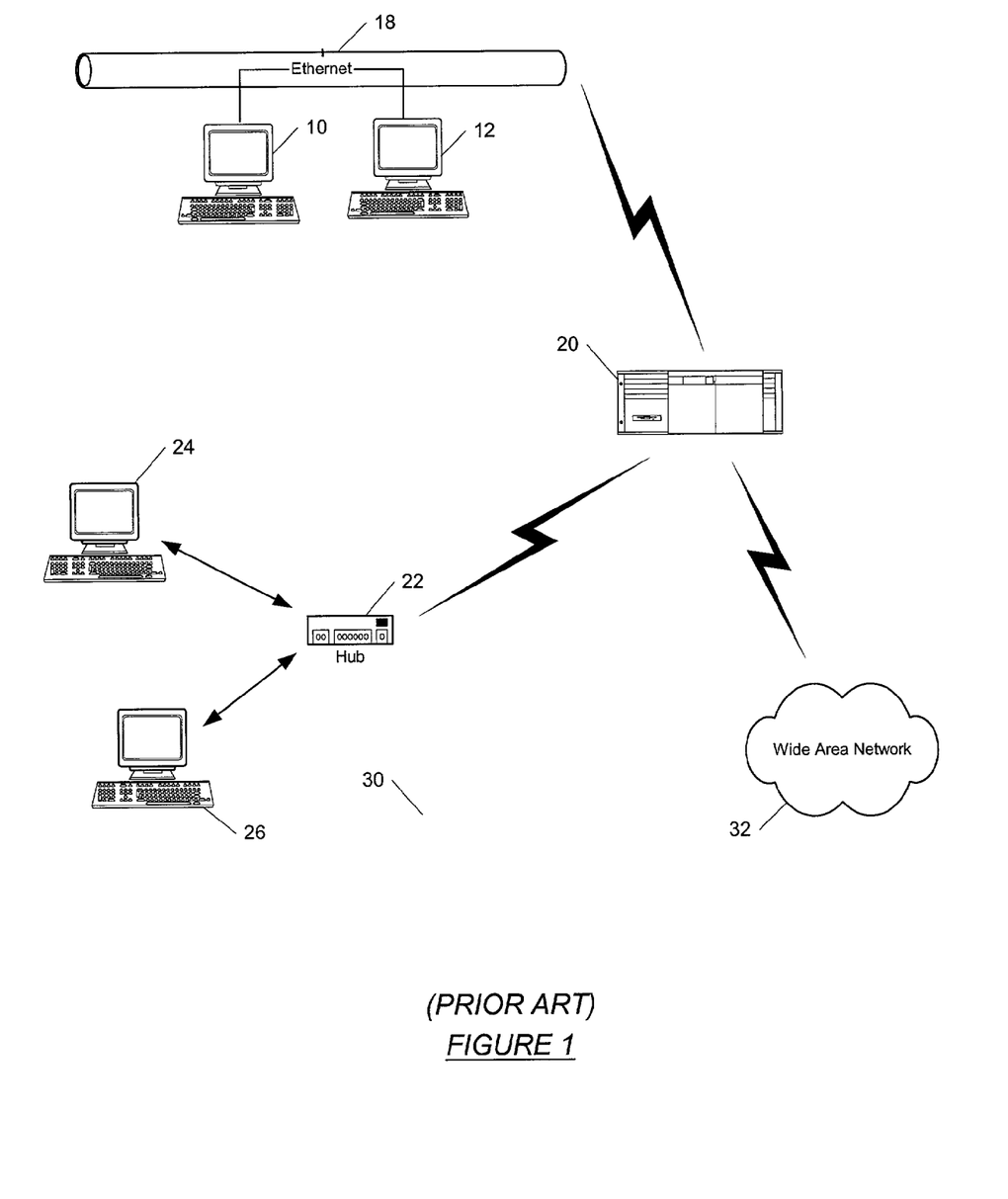
FIG. 1 illustrates a network workgroup environment.

Computers are used to perform a wide assortment of tasks. Often computers are connected together as a group of computers known as a network. Referring to FIG. 1, a network workgroup is made up of a first client (10), a second client (12), with a connection (18) at one location, for example, an Ethernet connection. Using a router (20), a connection is made to a remote network via a hub (22). Connected to the hub (22) are a first remote client (24) and a second remote client (26). The entire networked workgroup is able to connect to a wide area network (32), e.g., the Internet, via the router (20). Connecting to the network via remote access is increasing in popularity as users seek to use computers away from the central network workgroup. In such cases, a remote client may be connected to the central network workgroup via a telephone line and a communication device known as a modem.

Managing dispersed serial connections and modem pools for large numbers of local and remote users creates the need for significant administrative support and careful attention to security and authorization. One method of security is to use public key technology although one skilled in the art can appreciate that other security methods may be used.

The basic concept involved in public key technology is a mathematical concept that can be used to relate certain pairs of large numbers (called keys) in a special way. If one of the keys is used to encrypt a message, the other key can be used to decrypt the message, and vice versa. Fundamental to this scheme is that only these two keys (called a key pair) are related in this way. So, in other words, if a message is encrypted with one key, the message can be decrypted only by the matching key in the pair. One key is called a private key and the other is called a public key. The private key is known only by the end user; the public key is published as widely as the end user desires.

Following is an example of how a private message is sent from a sender to a recipient. The recipient's public key is used to encrypt the message, which is then sent to the recipient, and the recipient uses his/her private key to decrypt the message. The sender knows that only the recipient can read the message because the message can only be decrypted using the recipient's private key. One concern with this arrangement is that the sender does not know whether the recipient's true public key is being used to encrypt the message. To overcome this concern, a certificate is employed.

A certificate binds a public key to an identity (and possibly other information about that identity). The sender and recipient share a trusted third party (e.g. a mutual friend, an organizational administrator, or a government agency). If the recipient goes to that trusted third party and proves his/her identity and presents his/her public key, that third party bundles and "signs", or verifies the authenticity of the public key along with the recipient's identity and any other appropriate information. This bundle of information is called a certificate, and the process of obtaining one is called certificate issuance.

A notable property of certificates is that public key tampering can be readily detected. The certificate is signed by the trusted third party (called a certificate authority, or CA), so that the sender is able to tell if the certificate has been tampered. The sender can tell because the CA is not recognized or the certification is improperly signed. Also, the sender can look at the certificate and verify that the certificate was, in fact, signed by the intended trusted third party. This mechanism assures that the recipient's public key really belongs to the recipient, at least to the level that trust exists in the certificate authority.

When a document is digitally signed, a mathematical value or "hash" is computed from all of the information that makes up this document. Then, the signer encrypts this hash using his private key. The signer attaches this encrypted hash along with his certificate, which also includes his public-key, to the original document.

When the authenticity of the document is to be verified, the verifier first verifies the authenticity of the signer's certificate, decrypt the signed hash using the signer's public key and then compare the signer's hash with a new hash of the original document. If the hashes match, then this document is the same one that the signer signed.

Computer security systems often include the use of security devices, such as memory sticks, security tokens, smart cards, etc. to store security information such as private keys, certificates, etc. for authentication purposes. A memory stick is a digital data storage device designed to be a standard storage and transfer media. Security tokens are typically electronic devices that include computer circuitry, built-in cryptographic functionality, a visual display, and battery. Some security tokens may also contain a keypad and a built in clock. Security tokens may range in size from credit card size to key-ring-attachment size. Smart cards are plastic, credit card sized, and tamper-resistant cards that include electronics components that serve as non-volatile memory, a microprocessor (a type of small computer), cryptographic components, and a random number generator.

The basic functionality of a computer is dictated by the type of operating system it uses. Various operating systems exist in the market place, including Solaris™ from Sun Microsystems Inc., Palo Alto, Calif., MacOS® from Apple Computer, Inc., Cupertino, Calif., Windows® 2000 and Windows NT®, from Microsoft Corporation, Redmond, Wash., and Linux. The different types of operating systems will be referred to herein as "platforms". Prior to the popularity of the Internet, software developers wrote programs specifically designed for individual platforms. Thus, a program written for one platform could not be run on another. However, the advent of the Internet made cross-platform compatibility a necessity.

The Java™ programming language was developed by Sun Microsystems, Inc. to address the problem of cross-platform compatibility. The Java™ programming language was designed to be simple for the programmer to use, yet able to run securely over a network and work on a wide range of platforms. A discussion of the Java™ language itself is beyond the scope of this document.

Java-enabled web browsers or similar computer applications such as Netscape® Navigator and Microsoft® Internet Explorer can execute a class of Java programs called applets to provide customized end user interface. Applets are like Java applications except that they automatically provide certain network communication capabilities and execute on the client machine in a protected environment for security precautions. Applets are written so that at run time, the applet may request additional privileges from the user of the Java-enabled web browser. If the request is granted by the user, the applet may operate outside of this secure environment.

Lightweight Directory Access Protocol (LDAP) is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

LDAP is an electronic communications protocol for enabling anyone to locate organizations, individuals, and other resources such as files and devices in a network, e.g., on the Internet or an Intranet. An LDAP-compliant directory leverages a single, master directory that owns all end user, group, and access control information. The directory is hierarchical, not relational, and is optimized for reading, reliability, and scalability. This directory becomes a specialized, central repository that contains information about objects and provides end user, group, and access control information to all applications on the network. For example, text, photos, links to web pages, binary data, and public key certificates may be stored in a directory and retrieved from a directory. The directory may be used to support a public key infrastructure (PKI). Typical use of PKI is in secure document distribution signing, and verification (such as encrypting, decrypting, and authenticating origin). The directory may also be used to provide the security management system with an end user list or end user identification for all end users in a widely spanning enterprise.

SUMMARY OF INVENTION

In general, in one aspect, the present invention involves an apparatus to unblock a security device issued to an end user comprising, an unblocking service for establishing a secure gateway, a client-side applet for securely transferring information among the unblocking service, the end user, and the security device, and an agent-side applet for securely transferring information between the unblocking service and a security agent. An Unblock Authorization Code (UAC) is securely transferred from the agent-side applet and the client-side applet to the unblocking service. An Unblock Code (UBC) is securely transferred from the unblocking service to the client-side applet. An client-side applet is set to check at a configurable frequency for determining that the UAC is generated. The client-side applet uses the UBC to unblock the security device.

In general, in one aspect, the present invention involves a method of unblocking a security device issued to an end user by a security agent, comprising establishing a secure gateway by an unblocking service. Information is transferred among the unblocking service, the end user, and the security device by a client-side applet in a secure manner. Information is transferred between the unblocking service and the security agent by an agent-side applet in a secure manner. An end user identifier and a password pair is presented by the end user for the client-side applet to connect to the unblocking service. An authentication process is performed for every transfer between the client-side applet and the unblocking service. The UAC is securely transferred from the agent-side applet to the unblocking service. The UAC is supplied to the end user by the security agent. In turn, the end user applies the UAC to the client-side applet. The UAC is securely transferred from the client-side applet to the unblocking service. The UAC transferred by the client-side applet and the agent-side applet are verified to match through the unblocking service. The UBC is securely transferred from the unblocking service to the client-side applet. The security device is unblocked by the client-side applet using the UBC.

The client-side applet checks at a configurable frequency to determine if the UAC is generated. The end user identifier and a security device identifier are correlated prior to acceptance of the UAC. The UBC is provided by the unblocking service to the client-side applet after correlation of the end user identifier, the password pair, and the security device identifier.

In general, in one aspect, the present invention involves a method of unblocking a security device issued to an end user using a security agent, comprising gathering information from the end user and the security device, verifying the information gathered from the end user and the security device, contacting the security agent by the end user, supplying end user information to the security agent, verifying identity of the end user by the security agent using an identity verification mechanism, generating the UAC by an agent-side applet, transferring the UAC to an unblocking service, storing the UAC against a security device record in a directory service, transferring the UAC to an unblocking service by the agent-side applet, storing the UAC against a security device record in a directory service, supplying the UAC from the security agent to the end user, applying the UAC to the client-side applet by the end user, delivering the UAC securely from the client-side applet to the unblocking service, verifying the UAC transferred by the client-side applet and the agent-side applet match through the unblocking service requesting the UBC from the directory service, unblocking the security device by transferring the UBC from the directory service to the client-side applet, gathering information from the end user using the client-side applet, gathering information from the security device using the client-side applet, generating a new UBC by the client-side applet, setting the security device to the new UBC, delivering the new UBC to the directory service, and verifying the security device is not already permanently blocked.

In general, in one aspect, the present invention involves a computer system adapted to unblock a security device issued to an end user, comprising a processor, a memory, and software instructions. The software instructions enable the computer under control of the processor, to establish a secure gateway by an unblocking service, transfer information among the unblocking service, the end user, and the security device by a client-side applet in a secure manner, transfer information between the unblocking service and a security agent by an agent-side applet in a secure manner, transfer the UAC securely from the agent-side applet and the client-side applet to the unblocking service, transfer the UBC securely from the unblocking service to the client-side applet, and unblock the security device by the client-side applet using the UBC.

In general, in one aspect, the present invention involves an apparatus for unblocking a security device issued to an end user using a security device, comprising means for establishing a secure gateway by an unblocking service, means for transferring information among the unblocking service, the end user, and the security device by a client-side applet in a secure manner, means for transferring information between the unblocking service and a security agent by an agent-side applet in a secure manner, means for transferring the UAC securely from the agent-side applet and the client-side applet to the unblocking service, means for transferring the UBC securely from the unblocking service to the client-side applet, and means for unblocking the security device by the client-side applet using the UBC.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

Figure 2:
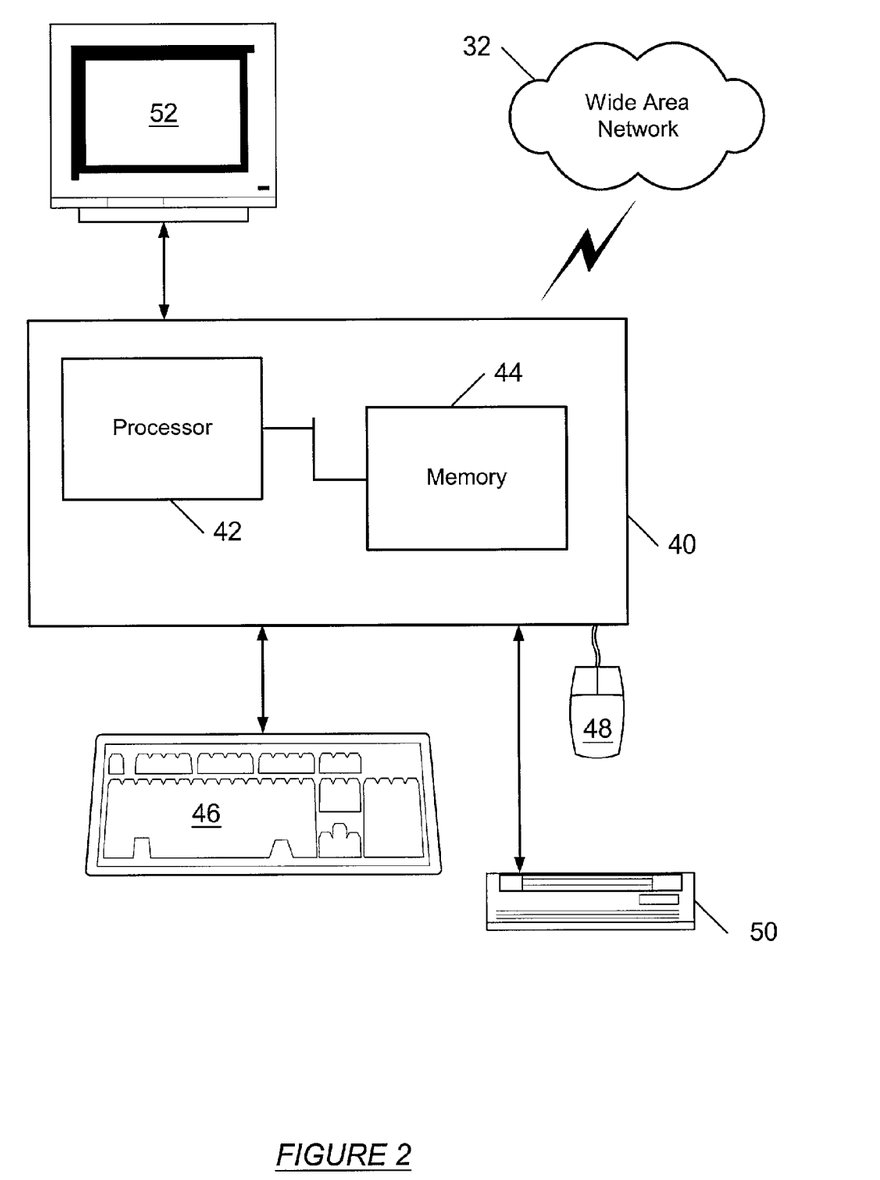
FIG. 2 illustrates a typical computer with components.

The invention described here may be implemented on virtually any type of computer regardless of the platform being used. For example, as shown in FIG. 2, a computer (40) in accordance with an embodiment of the present invention has a processor (42), associated memory (44), and numerous other elements and functionalities typical to today's computers (not shown). The computer (40) has associated therewith input means such as a keyboard (46), a mouse (48), and a security device reader, such as a card reader (50), although in an accessible environment these input means may take other forms. The computer (40) is also associated with an output device such as a display (52), which may also take a different form in an accessible environment. Finally, computer (40) is connected to a wide area network (32) such as the Internet.

Schlumberger Smart Port (SSP) is a security system typically deployed on a computer or computer network. As commonly implemented, the SSP is based on security devices, e.g., smart cards, security tokens, etc. to provide strong end user authentication for communication between various entities, such as between businesses, and between businesses and clients, and between businesses and employees. SSP is commonly used for electronic commerce authorization on multiple types of networks, e.g., Internet, Intranet, and extranet, etc. Strong end user authentication is an authentication technique that permits entities to provide evidence that they know a particular secret without revealing the secret. SSP also supports a user name and password level of security.

The relevant levels of end user access for SSP are classified as a registered end user, a smart-card-enabled end user, and a security agent. The registered end user is any user registered to access SSP with a user-directory account. The smart card-enabled end user provides the highest level of security for the end user classified with this designation. The smart card-enabled end user is also considered a registered end user. The security agent (or security officer) has sufficient access to perform administrative tasks within SSP, such as unblocking an end user smart card, etc.

The smart card issued to the smart card-enabled end user may be used to store the end user's personal digital credentials (a public and private key pair, certificate, etc.). The smart card also enables the end user to manage personal information via a web browser interface such as a SSP user management web site. The personal information may include a personal identification number (PIN) that is associated with the smart card and/or end user. The PIN is required in all significant operations involving the smart card. For example, the PIN is required if the end user logs onto SSP using the smart card. Changes made to the end user's personal information at one location via the SSP user management web site apply to all similar locations throughout the system.

Typical initialization of a smart card for use with SSP involves possession of a smart card, a reference number and full authorization code, a device with which to read smart cards or other security devices (e.g., a smart card reader), and appropriate software installed on a computer at the location of the end user. The smart card is prepared for use in coordination with entities commonly known as a Registration Authority (RA), a Local Registration Authority, and a Certificate Authority (CA).

Figure 3:
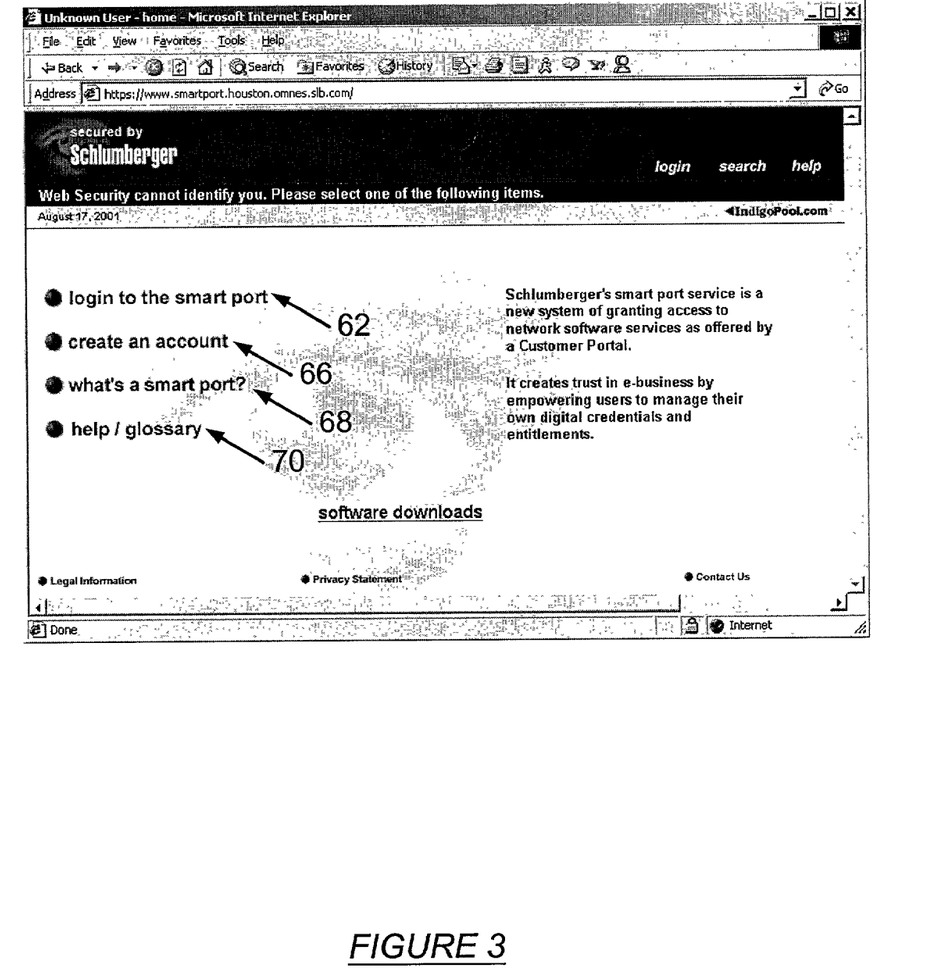
FIG. 3 illustrates a computer screenshot of the SSP end user management web page in accordance with an embodiment of the present invention.
Figure 4:
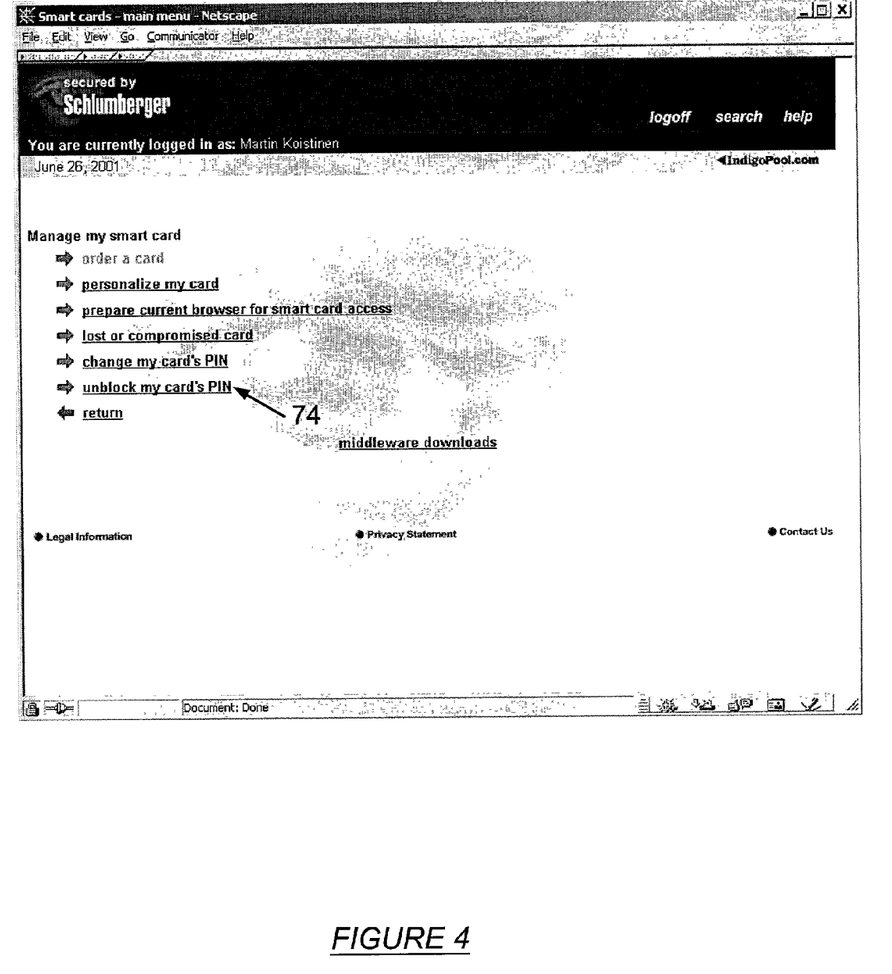
FIG. 4 illustrates a computer screenshot of the manage my smart card web page in accordance with an embodiment of the present invention.

Upon first accessing the SSP end user management web site, the end user is presented with a series of options through a web page on the web browser. Referring to FIG. 3, the end user may login to the smart port (62), create an account (66), find out what a smart port is (68), or read the help and glossary documents (70). After logging onto smart port, a web page on the web browser displays a "Manage My Smart Card" web page (72) as shown in FIG. 4. One option on this web page is to "unblock my card's PIN" (74). The smart card can become blocked when a user attempts to unlock the card with the wrong PIN too many times. To unblock the smart card, a security agent is required to reactivate the smart card.

In one or more embodiments of the present invention, an end user unable to physically visit a security agent is able to have a smart card unblocked. Using a remote unblocking security agent application ("application"), a security agent is able to interact with the user remotely and the smart card so the security agent can verify the end user's identity and then securely unblock the smart card from a remote location, such as a workstation over the Internet, down the hallway, etc.

Figure 5:
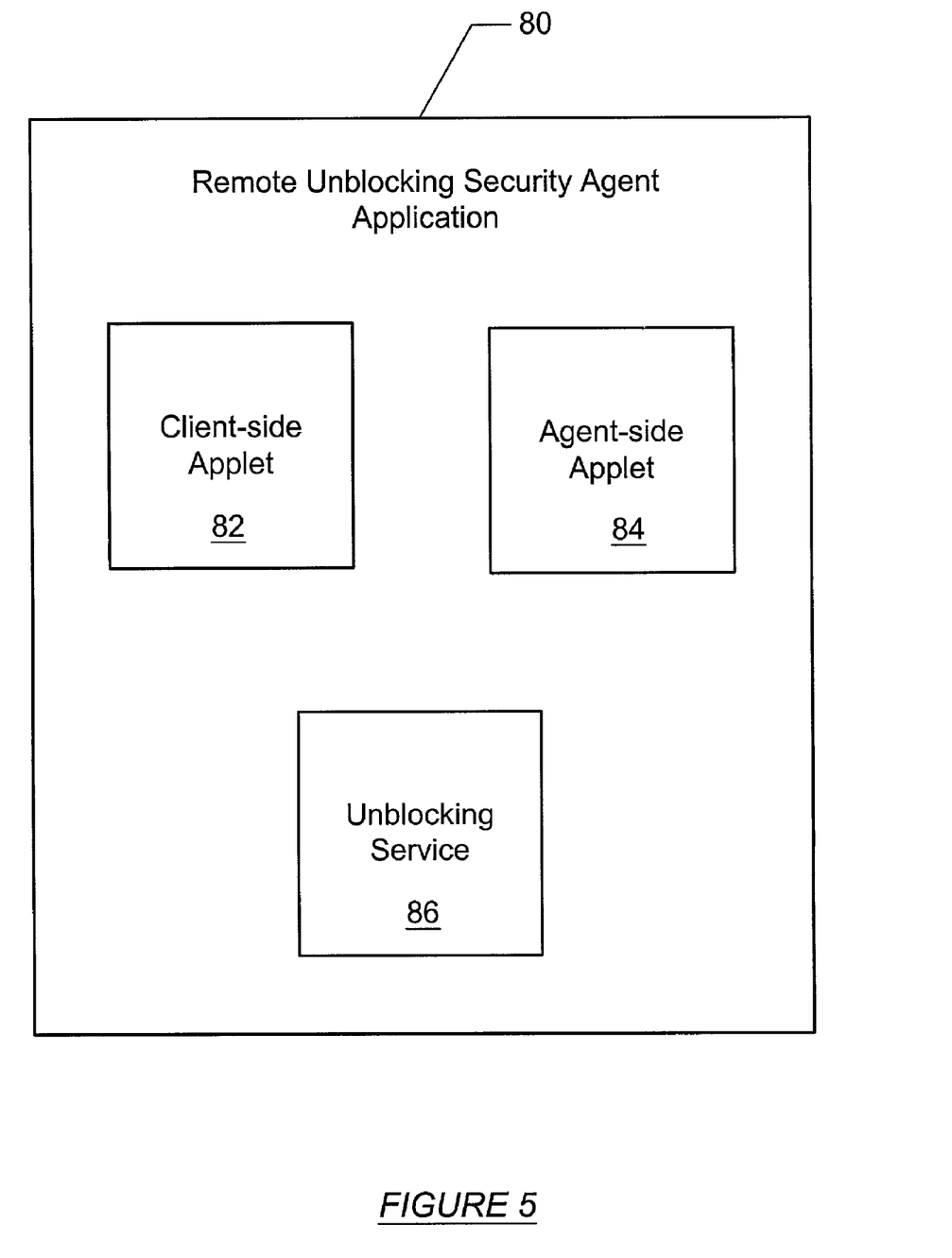
FIG. 5 illustrates a block diagram of a system in accordance with an embodiment of the present invention.

Referring to FIG. 5, the application (80) includes three main components, but relies on several others. The first component is a client-side Applet (82). The second element is an agent-side Applet (84). The third element is an unblocking service (86). To ensure security, a new authentication process is performed for every interaction between the client-side Applet and the unblocking service.

The client-side Applet interacts with an end user, an end user web browser, an end user smart card, a directory service (e.g., LDAP), and an unblocking service. The end user accesses the application through the main menu of the "Manage My Smart Card" web page (72) of the SSP user management web site as shown in FIG. 4. The web site includes an option to unblock a smart card PIN (74).

Figure 6:
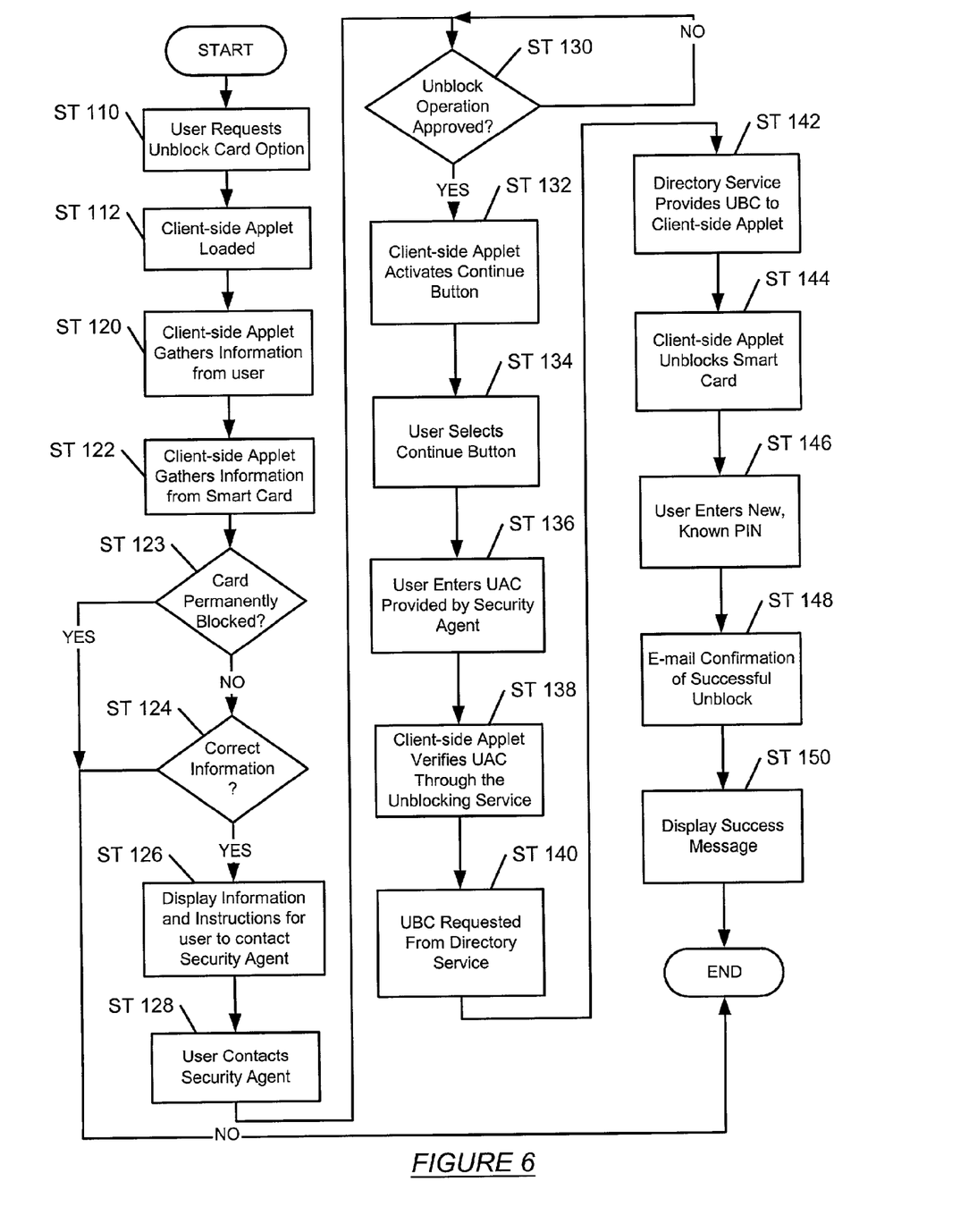
FIG. 6 is a flow chart describing a process in accordance with an embodiment of the present invention.

Referring to FIG. 6, the client-side Applet is accessed by the end user by selecting the option to unblock the smart card (74) on the web site (Step 110). In fact, once the option is selected, the client-side Applet is loaded. (Step 112). Next, the client-side Applet gathers an end user identifier (e.g., e-mail address, unique identifier, serial number, distinguished name, social security number, etc.) and the SSP password directly from the end user on the client computer (Step 120). The client-side Applet also gathers a smart card identifier (e.g., serial number, device number, etc.) directly from the end user's smart card (Step 122). The serial number is gathered via an interface to a smart card middleware component that is installed on the client computer. This middleware component, in turn, makes a connection to the smart card reader holding the smart card and returns the smart card serial number to the client-side Applet. Additionally, an initial "unblock" attempt without a proper UnBlock Code (UBC) is performed to verify the smart card is not permanently blocked (Step 123). Just like a smart card can be blocked when the PIN number is entered incorrectly too often, the smart card can become permanently blocked when the UBC is entered incorrectly too many times. If the "unblock" attempt results in a determination that the smart card is permanently blocked, a message indicating such is displayed, and the smart card is unable to be unblocked.

Figure 7:
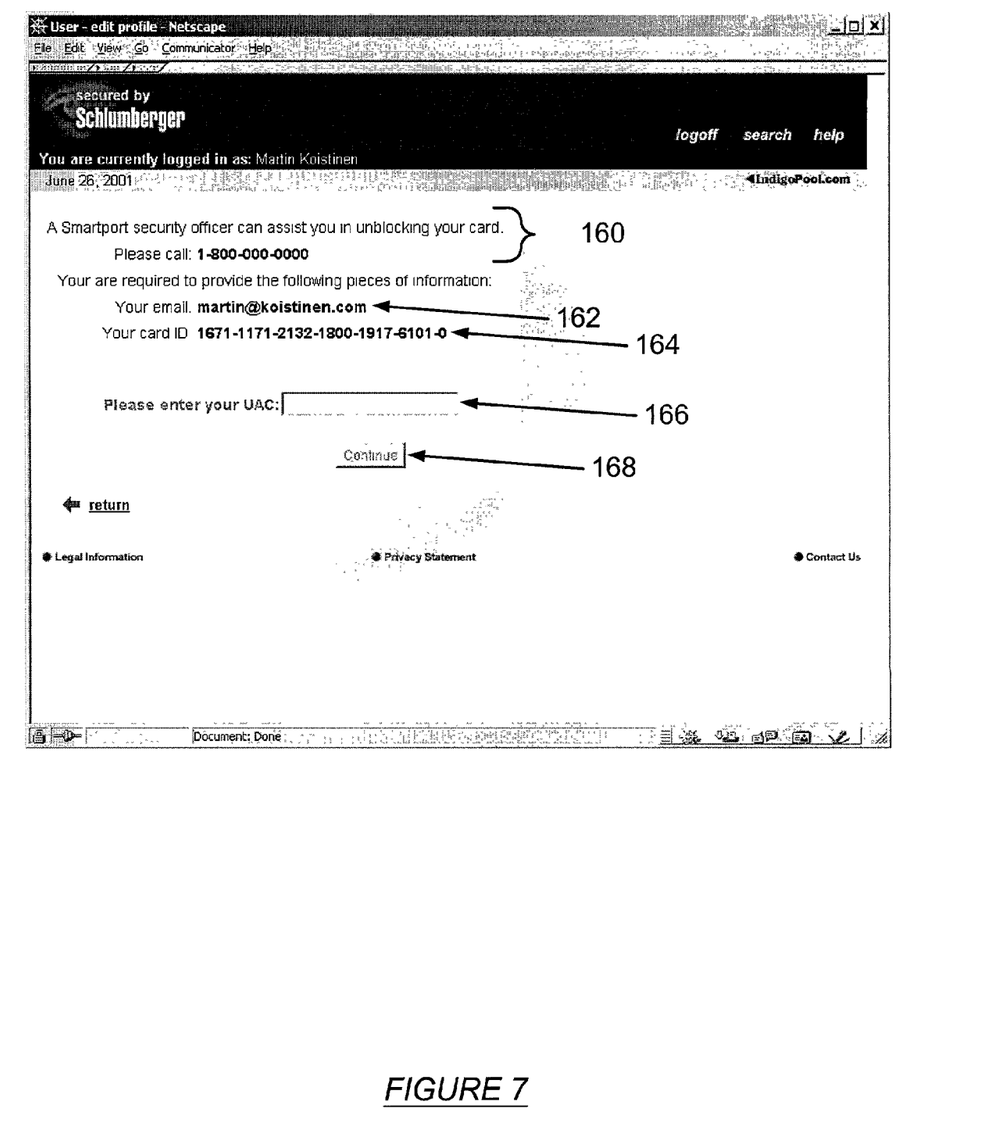
FIG. 7 illustrates a computer screenshot of an end user web browser displaying contact information in accordance with an embodiment of the present invention.

Once the client-side Applet has gathered the smart card serial number, the user e-mail address, and the SSP password, the information is verified to be correct (Step 124). If the information is correct, the smart card serial number is displayed on the client computer along with instructions informing the end user to telephone or otherwise contact the security agent (Step 126). FIG. 7 shows an example of the instructions displayed on the client computer showing contact information for the security agent (160). The end user is also prompted on the client computer that additional information, such as the user e-mail address (162), the smart card serial number (164), etc. may be requested by the security agent.

As the user contacts the security agent (Step 128), the client-side Applet begins checking the unblocking service to see if the unblock operation has been approved (Step 130) as shown in FIG. 6. The client-side Applet periodically checks for the existence of an Unblock Authorization Code (UAC), indicating that the unblock operation has been approved, at a configurable frequency. One purpose for the periodic checks being performed is to assist end users that cannot be continuously online and contact the agent simultaneously.

As a result, prior to the end user receiving the UAC, an input field to enter the UAC (166) and a continue button (168) are disabled and grayed-out to prevent access to the field until the unblock operation has been approved and the UAC exists as shown in FIG. 7. Referring back to FIG. 6, once the security agent authorizes the unblock request, the client-side Applet activates the previously disabled continue button (Step 132). If the UAC exists, the end user may immediately proceed with the unblocking process.

Figure 8:
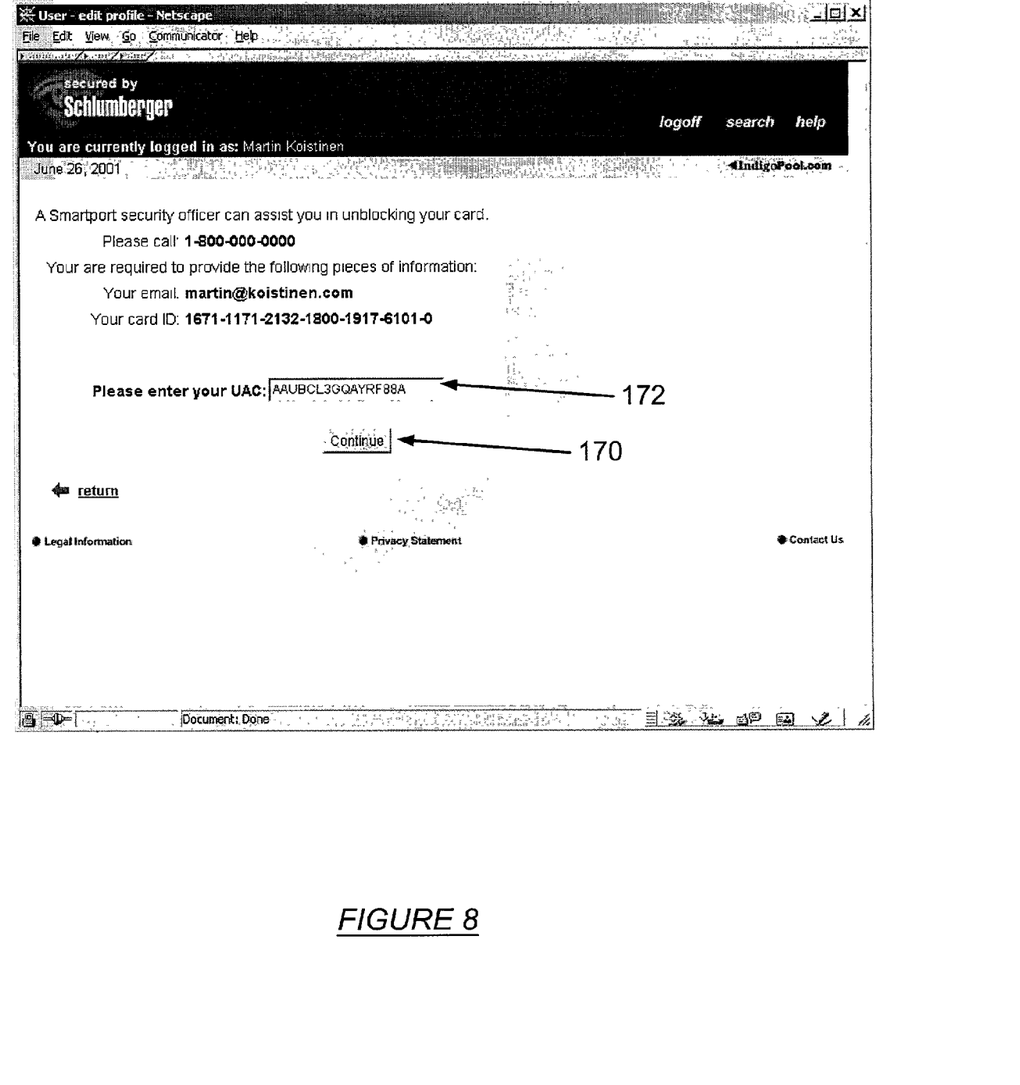
FIG. 8 illustrates a computer screenshot of an end user web browser displaying contact information with the UAC entered in accordance with an embodiment of the present invention.

When the end user selects the continue button (Step 134), the UAC provided by the security agent over the telephone or other means may be entered into the input field to enter the UAC (Step 136). An example of the client-side Applet on the end user web browser showing the activated continue button (170) and a end user-entered UAC (172) is shown in FIG. 8. Referring back to FIG. 6, the client-side Applet securely verifies the end user-entered UAC through the unblocking service (Step 138) and requests the UBC from a directory service, e.g., LDAP (Step 140). Once the directory service provides the UBC to the client-side Applet (Step 142), the client-side Applet unblocks the previously blocked smart card (Step 144) and allows the end user to enter a new, known PIN (Step 146). At this point, the smart card is successfully unblocked, the user is notified by e-mail of the unblock status (Step 148), a message that the smart card is successfully unblocked is displayed to the end user web browser (Step 150), and the user is able to use the card normally.

The agent-side Applet interacts with a security agent, a security agent web browser, a directory service (e.g., an LDAP server), and the unblocking service. The agent-side Applet is responsible for verifying that the remote user identified with a given e-mail address exists and was previously assigned a smart card with a given smart card serial number. The agent-side Applet interacts in a secure manner with the unblocking service to transfer the necessary information to the security agent.

Figure 9:
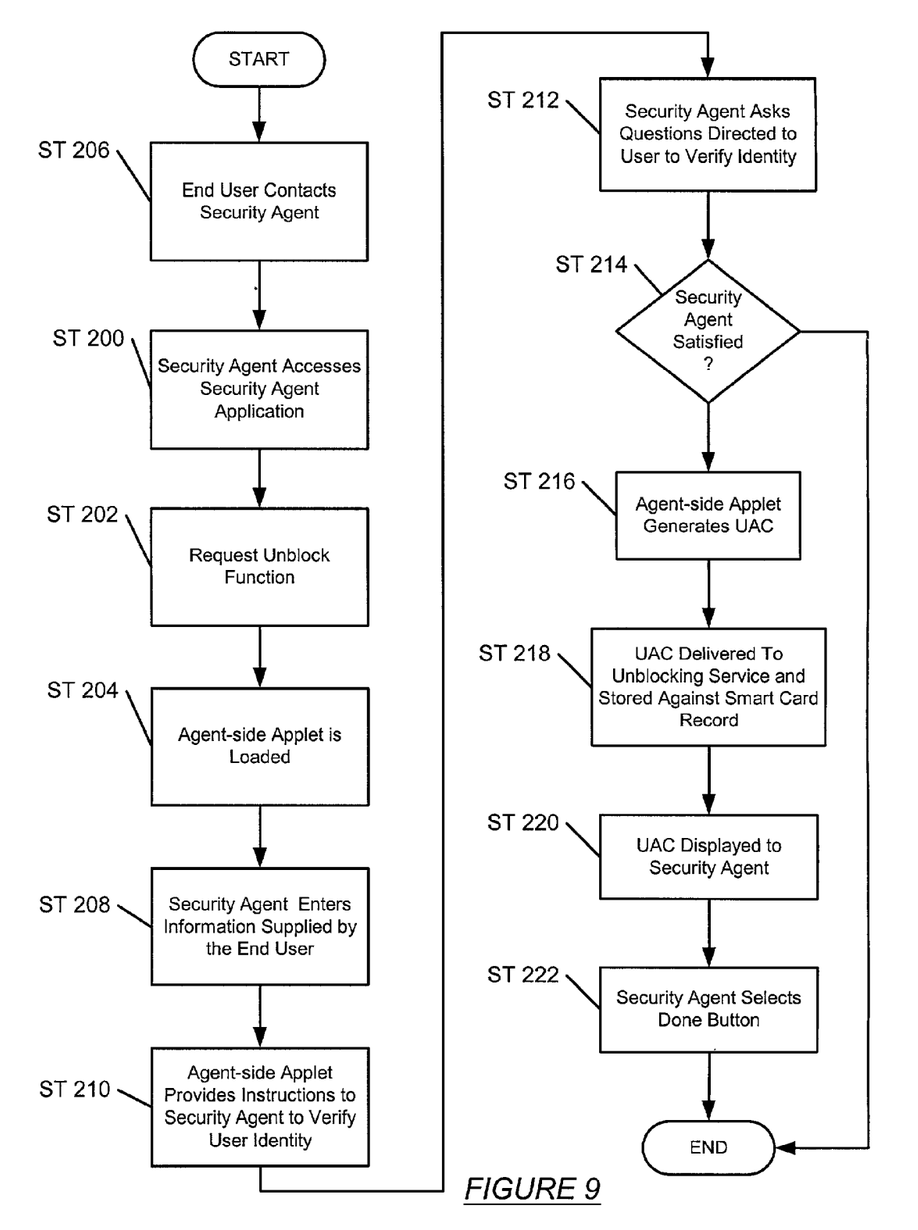
FIG. 9 is a flow chart describing a process in accordance with an embodiment of the present invention.
Figure 10:
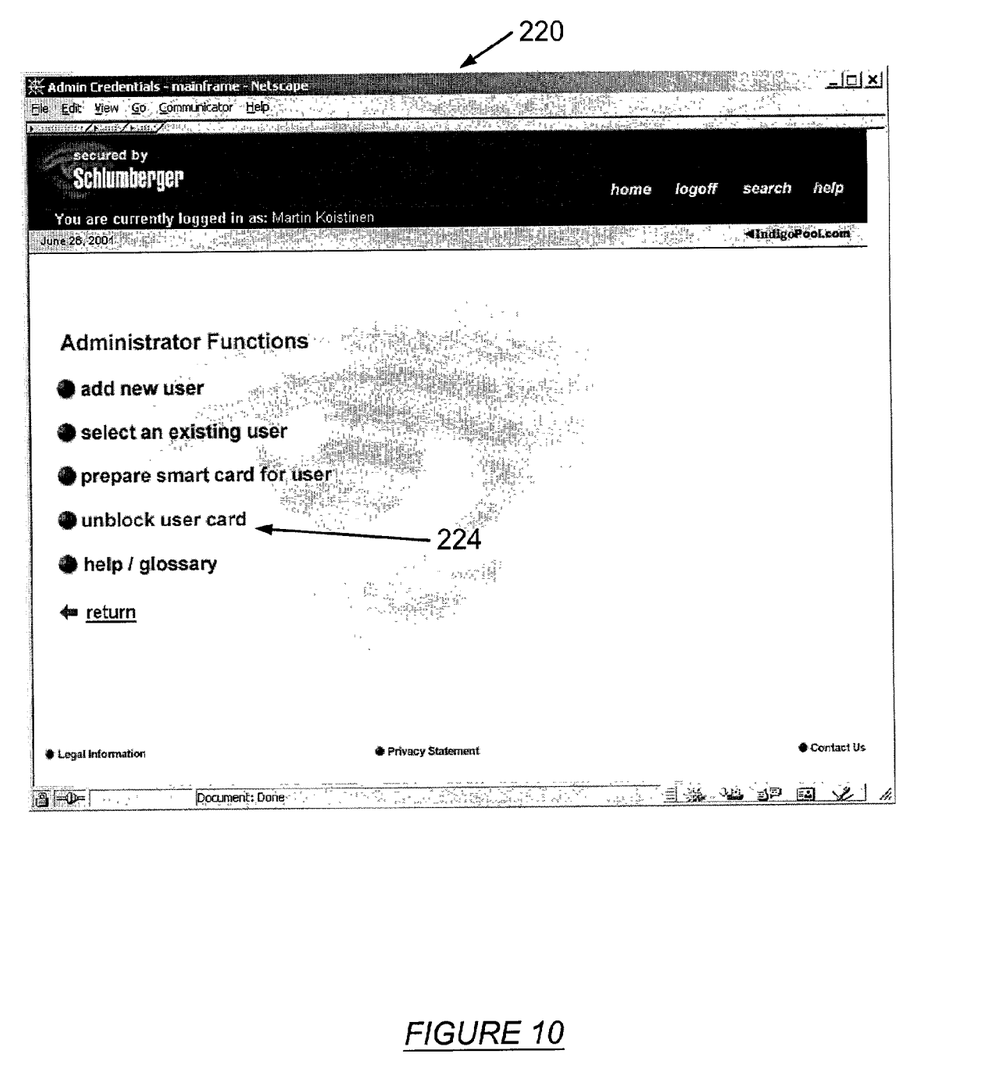
FIG. 10 illustrates a computer screenshot of an administrator web page in accordance with an embodiment of the present invention.
Figure 11:
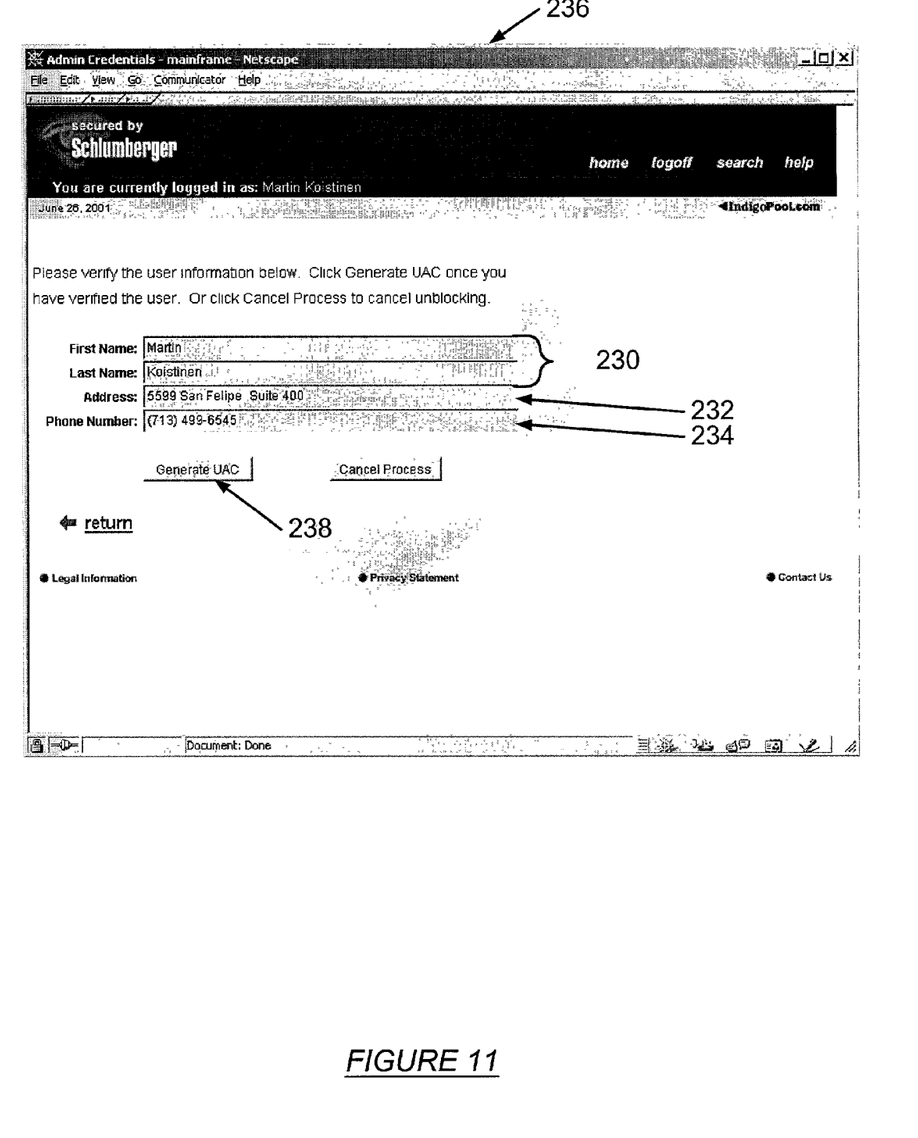
FIG. 11 illustrates a computer screenshot of a security agent web browser displaying end user information in accordance with an embodiment of the present invention.

Referring to FIG. 9, the end user contacts the security agent (Step 206). Next, the security agent accesses the remote unblocking security agent application (Step 200) through an administrator web page (220) of the SSP user management web site as shown in FIG. 10. The administrator web page includes an option to unblock an end user smart card (224). Upon requesting the unblock function by selecting the option to unblock an end user smart card (224) (Step 202 in FIG. 9), the agent-side Applet is loaded (Step 204 in FIG. 9. Next, the security agent enters the e-mail address and serial number of the smart card of the blocked end user from information supplied by the blocked end user (Step 208 in FIG. 9). Using this information, the agent-side Applet provides instructions to the security agent computer to allow verification of the identity of the end user by the security agent using a variety of identity verification mechanisms (Step 210 in FIG. 9). In one or more embodiments of the present invention, the security agent web browser may show information about the end user including a first and last name (230), an address (232), a phone number (234), etc. displayed on the security agent web browser (236) as shown in FIG. 11. Using this information (but not these specific pieces of information), the security agent is able to ask a variety of identity verification mechanisms directed to the end user, e.g., wife's name, child's name, schedule, supervisor, shared secret, phone number, etc. and elicits answers from the end user in an effort to verify the remote user is not an imposter (Step 212 in FIG. 9). These questions are drawn from a variety of sources and may include non-technical questions or any other question at the discretion of the security agent.

Figure 12:
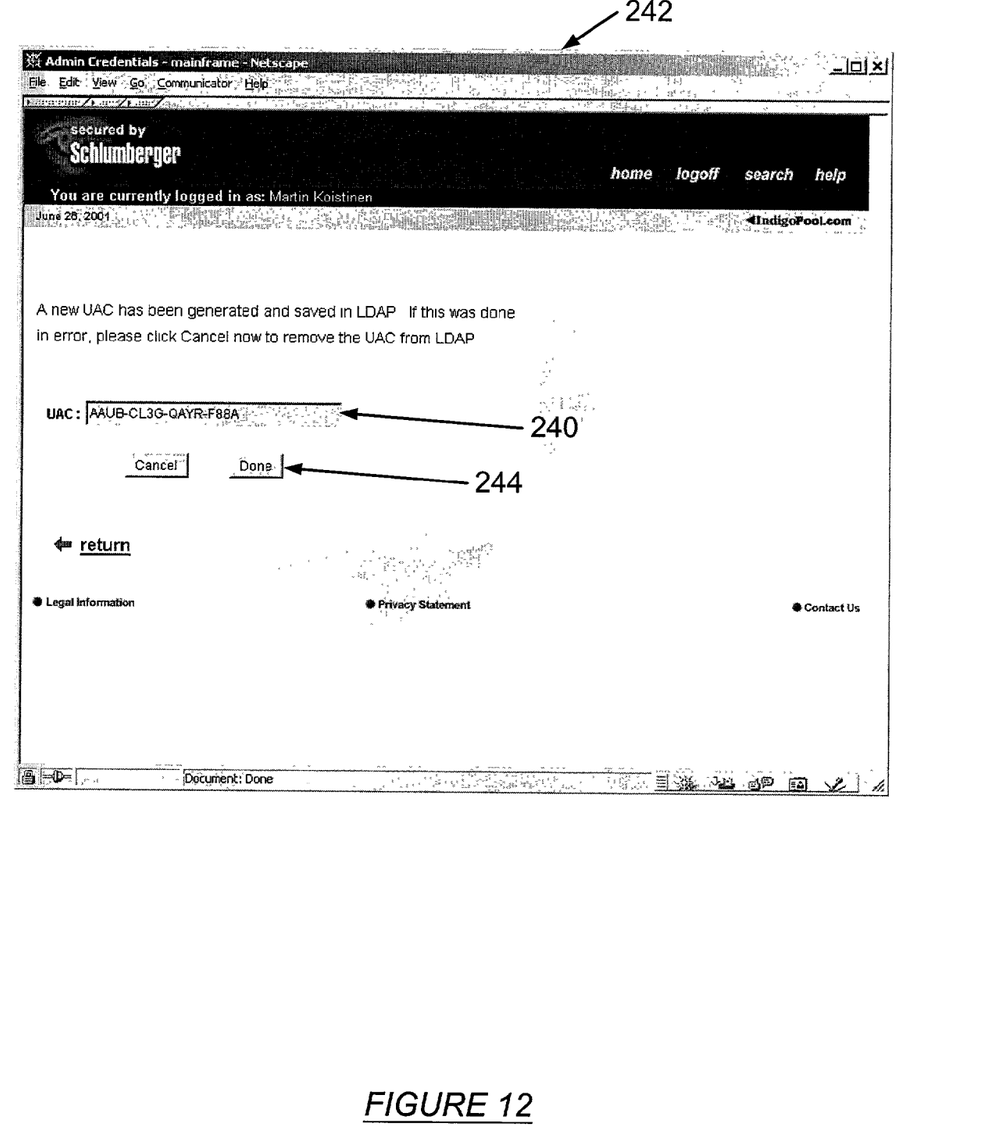
FIG. 12 illustrates a computer screenshot of a security agent web browser displaying the UAC in accordance with an embodiment of the present invention.

Once the security agent is satisfied that the end user is not an imposter and indeed, the end user specified with the provided e-mail address, the security agent selects a generate UAC button (238 in FIG. 11) on the agent-side Applet that causes the agent-side Applet to generate the UAC (Step 214 in FIG. 9). A new UAC (240 in FIG. 12) is delivered by a secure manner to the unblocking service via the Internet for storage against a smart card record of the end user in a directory service, e.g., SSP User Directory (Step 216 in FIG. 9), and displayed on the security agent web browser (242 in FIG. 12) to the security agent (Step 218 in FIG. 9). To complete the unblocking operation for the agent-side applet, the security agent selects the done button (242 in FIG. 12) (Step 220 in FIG. 9). Among other responsibilities, the unblocking service is responsible for establishing a secure gateway to the end user and smart card information.

In order for the client-side Applet to connect, a valid e-mail address and password pair is presented by the end user. The UAC is not accepted by the unblocking service unless the provided remote user e-mail address and smart card serial number are indeed already correlated. Likewise, the UBC is not provided by the unblocking service to the client-side Applet unless the provided e-mail address, password, and smart card serial number are already correlated. Once the smart card is successfully unblocked, the client-side Applet generates a new UBC, sets the smart card UBC to this new value, and delivers the new UBC to a directory service, e.g., the unblocking service, for use the next time the smart card is blocked.

Advantages of the present invention may include one or more of the following. A security device may be unblocked without physically meeting a security agent face-to-face. A reliable and secure authentication process is maintained while still allowing remote users the convenience of unblocking a security device remotely. A security agent has the ability to use a variety of identity verification mechanisms to discover imposters. An end user is allowed to have a security device unblocking without requiring more than one active phone line. The application facilitates trusted network connections for remote users. Lowers costs to maintain a secure network. Fewer security agents are required to service unblocking requests. In lieu of presetting the smart card PIN, this unblocking mechanism may be useful where the card is delivered without a known PIN, or deliberately in a blocked state. The process of unblocking with the security agent is then a mechanism for verifying that the recipient of the smart card is indeed the intended recipient before the smart card is unblocked and ready for use. Those skilled in the art will appreciate that the present invention may have further advantages.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. An apparatus to unblock a security device issued to an end user, comprising:
 a client-side transfer agent for securely transferring information among an unblocking service, the end user, and the security device;
 an agent-side transfer agent for securely transferring information between the unblocking service and a security agent;
 an Unblock Authorization Code (UAC) generated after verification by the security agent and securely transferred from the agent-side transfer agent to the unblocking service, wherein verification comprises verifying the end user is assigned the security device while the end user is in possession of the security device;
 an Unblock Code (UBC) securely transferred from the unblocking service to the client-side transfer agent, wherein the client-side transfer agent uses the UBC to unblock the security device; and
 the unblocking service for establishing a secure gateway and storing the UAC and UBC,
 wherein the security device is configured to be accessed by a security device reader operatively connected and allowing access to a computer system to provide strong end user authentication, and
 wherein the security device is a smart card.

2. The apparatus of claim 1, wherein the security agent unblocks the security device from a remote location.

3. The apparatus of claim 1, wherein an end user identifier and a password is presented by the end user for the client-side transfer agent to connect to the unblocking service.

4. The apparatus of claim 3, wherein the end user identifier is an e-mail address.

5. The apparatus of claim 1, wherein the secure gateway is configured to perform an authentication process for every transfer between the client-side transfer agent and the unblocking service.

6. The apparatus of claim 1, wherein the end user is remote.

7. The apparatus of claim 1, wherein the apparatus is accessible via a web interface.

8. The apparatus of claim 1, wherein the client-side transfer agent is configured to check periodically at a configurable frequency for the UAC.

9. The apparatus of claim 1, wherein the UAC is accepted upon correlation of an end user identifier and a security device identifier, wherein the unblocking service transfers the UBC to the client-side transfer agent after acceptance of the UAC by the unblocking service.

10. The apparatus of claim 9, wherein the security device identifier is a serial number.

11. The apparatus of claim 9, wherein the end user identifier is an e-mail address.

12. The apparatus of claim 1, wherein the UBC is provided by the unblocking service to the client-side transfer agent after correlation of an end user identifier, a password, end a security device identifier.

13. The apparatus of claim 12, wherein the security device identifier is a serial number.

14. The apparatus of claim 12, wherein the end user identifier is an e-mail address.

15. A method of unblocking a security device issued to an end user, comprising:
 establishing a secure gateway by an unblocking service;
 transferring information among the unblocking service, the end user, and the security device in a secure manner;
 transferring information between the unblocking service and the security agent in a secure manner;
 generating an Unblock Authorization Code (UAC) after verification by a security agent, wherein verification comprises verifying the end user is assigned the security device while the end user is in possession of the security device;
 transferring the UAC securely from an agent-side transfer agent to the unblocking service;
 supplying the UAC to the end user by the security agent;
 applying the UAC to a client-side transfer agent by the end user;
 transferring the UAC securely from the client-side transfer agent to the unblocking service;
 verifying the UAC transferred by the client-side transfer agent and the agent-side transfer agent match;
 transferring an Unblock Code (UBC) securely from the unblocking service to the client-side transfer agent; and
 unblocking the security device using the UBC,
 wherein the unblocking service stores the UAC and the UBC,
 wherein the security agent and the agent-side transfer agent are unable to access the UBC, wherein the security device is configured to be accessed by a security device reader operatively connected and allowing access to a computer system to provide strong end user authentication, and wherein the security device is a smart card.

16. The method of claim 15, wherein the security agent unblocks the security device from a remote location.

17. The method of claim 15, wherein the end user is remote.

18. The method of claim 15, further comprising:
presenting an end user identifier and a password by the end user for a client-side transfer agent to connect to the unblocking service.

19. The method of claim 15, further comprising:
performing an authentication process for every transfer between a client-side transfer agent and the unblocking service.

20. The method of claim 15, further comprising:
checking at a configurable frequency to determine whether the UAC is generated.

21. The method of claim 15, further comprising: correlating an end user identifier and security device identifier prior to acceptance of the UAC, wherein the unblocking service transfers the UBC to the client-side transfer agent after acceptance of the UAC by the unblocking service.

22. The method of claim 15, further comprising:
providing the UBC by the unblocking service to the client-side transfer agent after correlation of an end user identifier, a password, and a security device identifier.

23. A method of unblocking a security device issued to an end user, comprising:
establishing a secure gateway by an unblocking service;
transferring information among the unblocking service, the end user, and the security device in a secure manner;
transferring information between the unblocking service and the security agent in a secure manner;
presenting an end user identifier and a password by the end user for a client-side transfer agent to connect to the unblocking service;
performing an authentication process for every transfer between the client-side transfer agent and the unblocking service;
generating an Unblock Authorization Code (UAC) after verification by a security agent, wherein verification comprises verifying the end user is assigned the security device while the end user is in possession of the security device;
transferring the UAC securely from an agent-side transfer agent to the unblocking service;
supplying the UAC to the end user by the security agent;
applying the UAC to the client-side transfer agent by the end user;
transferring the UAC securely from the client-side transfer agent to the unblocking service;
verifying the UAC transferred by the client-side transfer agent and the agent-side transfer agent match through the unblocking service;
transferring an Unblock Code (UBC) securely from the unblocking service to the client-side transfer agent;
unblocking the security device using the UBC;
checking at a configurable frequency to determine whether the UAC is generated;
correlating the end user identifier and a security device identifier prior to acceptance of the UAC; and providing the UBC by the unblocking service to the client-side transfer agent after correlation of the end user identifier, the password, and the security device identifier, wherein the unblocking service stores the UAC and the UBC, wherein the security device is configured to be accessed by a security device reader operatively connected and allowing access to a computer system to provide strong end user authentication, and wherein the security device is a smart card.

24. A method of unblocking a security device issued to an end user, comprising:
gathering information from the end user and the security device;
verifying the information gathered from the end user and the security device;
contacting the security agent by the end user;
supplying end user information verbally to the security agent;
verifying identity of the end user by the security agent using an identity verification mechanism;
generating an Unblock Authorization Code (UAC) after verification by the security agent, wherein verification comprises verifying the end user is assigned the security device while the end user is in possession of the security device;
delivering the UAC to an unblocking service;
storing the UAC against a security device record in a directory service;
supplying the UAC from the security agent to the end user;
applying the UAC to a client-side transfer agent by the end user;
delivering the UAC securely from the client-side transfer agent to the unblocking service;
verifying the UAC of the client-side transfer agent and an agent-side transfer agent match through the unblocking service;
requesting an Unblock Code (UBC) from the directory service;
unblocking the security device by transferring the UBC from the directory service to the client-side transfer agent;
wherein the unblocking service stores the UAC and the UBC,
wherein the security device is configured to be accessed by a security device reader operatively connected and allowing access to a computer system to provide strong end user authentication, and
wherein the security device is a smart card.

25. The method of claim 24, wherein the security device identifier is a serial number.

26. The method of claim 24, wherein the end user identifier is an e-mail address.

27. The method of claim 24, further comprising:
gathering information from the end user using the client-side transfer agent; and
gathering information from the security device using the client-side transfer agent.

28. The method of claim 24, further comprising:
generating a new UBC;
setting the security device to the new UBC; and
delivering the new UBC to the directory service.

29. The method of claim 24, further comprising:
verifying the security device is not already permanently blocked.

30. A method of unblocking a security device issued to an end user, comprising:
  gathering information from the end user and the security device;
  verifying the information gathered from the end user and the security device;
  contacting the security agent by the end user;
  supplying end user information to the security agent;
  verifying identity of the end user by the security agent using an identity verification mechanism;
  generating an Unblock Authorization Code (UAC) after verification by the security agent, wherein verification comprises verifying the end user is assigned the security device while the end user is in possession of the security device;
  transferring the UAC to an unblocking service;
  storing the UAC against a security device record in a directory service;
  transferring the UAC to an unblocking service;
  storing the UAC against a security device record in a directory service;
  supplying the UAC from the security agent to the end user;
  applying the UAC to a client-side transfer agent by the end user;
  delivering the UAC securely from the client-side transfer agent to the unblocking service;
  verifying the UAC transferred by the client-side transfer agent en agent-side transfer agent match through the unblocking service;
  requesting an Unblock Code (UBC) from the directory service;
  unblocking the security device by transferring the UBC from the directory service to the client-side transfer agent;
  gathering information from the end user using the client-side transfer agent;
  gathering information from the security device using the client-side transfer agent;
  generating a new UBC;
  setting the security device to the new UBC;
  delivering the new UBC to the directory service; and
  verifying the security device is not already permanently blocked,
  wherein the unblocking service stores the UAC and the UBC,
  wherein the security device is configured to be accessed by a security device reader operatively connected and allowing access to a computer system to provide strong end user authentication, and
  wherein the security device is a smart card.

31. A computer system adapted to unblock a security device issued to an end user, comprising:
  a processor;
  a memory, and
  software instructions for enabling the computer under control of the processor, to establish a secure gateway by an unblocking service;
  transfer information among the unblocking service, the end user, and the security device in a secure manner;
  transfer information between the unblocking service and a security agent in a secure manner;
  generating an Unblock Authorization Code (UAC) after verification by a security agent, wherein verification comprises verifying the end user is assigned the security device while the end user is in possession of the security device;
  transfer the UAC securely from an agent-side transfer agent and a client-side transfer agent to the unblocking service;
  transfer an Unblock Code (UBC) securely from the unblocking service to the client-side transfer agent; and
  unblock the security device using the UBC;
  wherein the unblocking service stores the UAC and the UBC,
  wherein the security device is configured to be accessed by a security device reader operatively connected to and allowing access to a computer system to provide strong end user authentication, and
  wherein the security device is a smart card.

32. An apparatus for unblocking a security device issued to an end user, comprising:
  means for establishing a secure gateway by an unblocking service;
  means for transferring information among the unblocking service, the end user, and the security device in a secure manner;
  means for transferring information between the unblocking service and a security agent in a secure manner;
  means for generating an Unblock Authorization Code (UAC) after verification by a security agent, wherein verification comprises verifying the end user is assigned the security device while the end user is in possession of the security device;
  means for transferring the UAC securely from an agent-side transfer agent and a client-side transfer agent to the unblocking service;
  means for transferring an Unblock Code (UBC) securely from the unblocking service to the client-side transfer agent; and
  means for unblocking the security device using the UBC;
  wherein the unblocking service stores the UAC and the UBC, and
  wherein the security device is configured to be accessed by a security device reader operatively connected and allowing access to a computer system to provide strong end user authentication, and
  wherein the security device is a smart card.

* * * * *